No. 834,207. PATENTED OCT. 23, 1906.
F. KAUFMANN.
FRUIT PICKER.
APPLICATION FILED AUG. 10, 1905.
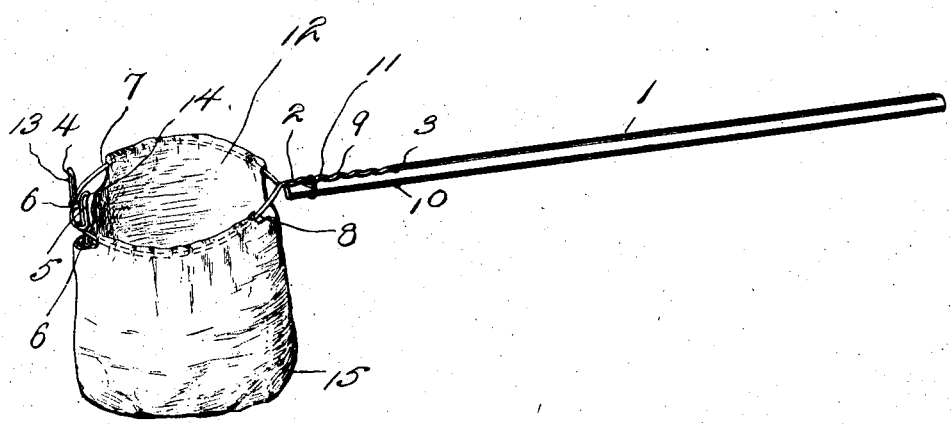
Witnesses
Inventor
Fred Kaufmann
By
Attorneys

UNITED STATES PATENT OFFICE.

FREDERICK KAUFMANN, OF BURLINGTON, IOWA.

FRUIT-PICKER.

No. 834,207.   Specification of Letters Patent.   Patented Oct. 23, 1906.

Application filed August 10, 1905. Serial No. 273,583.

*To all whom it may concern:*

Be it known that I, FREDERICK KAUFMANN, a citizen of the United States, residing at Burlington, in the county of Des Moines, State of Iowa, have invented certain new and useful Improvements in Fruit-Pickers; and I do hereby declare the following to be a full, clear, and exact description of the invention, such as will enable others skilled in the art to which it appertains to make and use the same.

This invention relates to fruit-gatherers.

One object of the invention is to provide an exceedingly simple, inexpensive, durable, and efficient device for the gathering of apples or other fruit.

Another object resides in the provision of a device of the character stated embodying such characteristics that the fruit may be picked from a tree or bush and dropped into a suitable receptacle without bruising the fruit either in the picking or dropping of the same into the receptacle.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the invention.

In the drawing there is shown a perspective view of my invention.

Referring now more particularly to the accompanying drawing, the reference character 1 designates a handle, of wood or any other suitable light material, having an annular groove 2 in its upper end, immediately below which is formed a perforation 3 for a purpose presently explained.

A frame consisting of a single piece of wire or other suitable material is so bent intermediate its ends as to form spaced fruit-engaging fingers 4 and 5 of a double thickness and then continued over and around the base or connecting bight portion 6 of the fingers 4 and 5 in semicircular form in opposite directions, as indicated by the reference characters 7 and 8, the extremities of the semicircular portion 7 and 8 being twisted upon themselves, as indicated by the reference character 9, and bent downwardly, as at 10, through the aforesaid perforation 3 of the handle or stick 1, whereby the wire frame is secured to the latter. To further secure the frame to the handle or stick, I provide a wire or other band 11, which fits in the aforesaid annular groove 2 of the stick or handle and passes around the twisted ends 9 of the wire frame. It will be seen that by the semicircular formation 7 and 8 of the wire frame there is formed a circular opening 12, secured at one side to the handle or stick 1, with its opposite side provided with the aforesaid fingers 4 and 5, which latter are directed inwardly over the wire frame with their free extremities bent outwardly from each other, as indicated by the reference characters 13 and 14, respectively.

Secured to the semicircular portions 7 and 8 of the frame is a bag or other receptacle 15, designed for the reception of the apples or other fruit as they are removed from the trees or bushes by the fingers 4 and 5. This bag or other receptacle may be formed of any suitable material, although it is preferred to form the same of canvas or any other ordinary bagging material.

By passing the ends of the wire around the base or bight portion of the fruit-engaging fingers the strands forming each finger will be held together and prevented from spreading outwardly, the fingers being thus strengthened and the space between the lower ends of the fingers being maintained constant.

In the use of the device the engaging fingers are reached over the apples or other fruit to be picked, one arm on each side of the stem of the fruit. A slight pull upon the handle will serve to detach the fruit from the twig, and the fruit will then fall through the frame into the bag, being forced thereinto by the shape of the fingers, the upper ends of which in practice may be bent inwardly so as to extend slightly over the edge of the bag.

What is claimed is—

A fruit-gatherer comprising a handle having an annular groove and a perforation formed in one end thereof; an annular frame consisting of a single strip of wire bent upon itself intermediate its ends to form a pair of spaced fruit-engaging fingers of double thickness, the free extremities thereof being bent outwardly from each other, said wire being continued over and around the bight portion of said fingers and having its ends twisted together and bent downwardly to pass through the said perforations in the handle; a band engaging said annular groove and passed over the twisted ends of the frame; and a receptacle connected to said frame for the reception of the fruit.

In testimony whereof I affix my signature in presence of two witnesses.

FRED. KAUFMANN.

Witnesses:
   C. S. RICH,
   EDW. A. KOHRS.